United States Patent
Kim et al.

(10) Patent No.: US 10,980,066 B2
(45) Date of Patent: Apr. 13, 2021

(54) METHOD AND USER EQUIPMENT FOR TRANSMITTING RANDOM ACCESS SIGNALS, AND METHOD AND BASE STATION FOR RECEIVING RANDOM ACCESS SIGNALS

(71) Applicant: LG Electronics Inc., Seoul (KR)

(72) Inventors: Eunsun Kim, Seoul (KR); Kijun Kim, Seoul (KR); Sukhyon Yoon, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/347,318

(22) PCT Filed: Nov. 6, 2017

(86) PCT No.: PCT/KR2017/012468
§ 371 (c)(1),
(2) Date: May 3, 2019

(87) PCT Pub. No.: WO2018/084663
PCT Pub. Date: May 11, 2018

(65) Prior Publication Data
US 2020/0059967 A1    Feb. 20, 2020

Related U.S. Application Data

(60) Provisional application No. 62/418,178, filed on Nov. 6, 2016, provisional application No. 62/482,653, filed on Apr. 6, 2017.

(51) Int. Cl.
*H04W 74/08* (2009.01)
*H04L 1/00* (2006.01)
(Continued)

(52) U.S. Cl.
CPC ....... *H04W 74/0833* (2013.01); *H04L 1/0026* (2013.01); *H04L 5/0051* (2013.01);
(Continued)

(58) Field of Classification Search
CPC .. H04L 1/0026; H04L 5/0051; H04W 56/001; H04W 74/0833
See application file for complete search history.

(56) References Cited

U.S. PATENT DOCUMENTS

2015/0223208 A1    8/2015  Park et al.
2016/0088660 A1    3/2016  Liu et al.
2019/0387554 A1*  12/2019  Guo ..................... H04B 7/0697

OTHER PUBLICATIONS

EventHelix, LTE Random Access Procedure, In: EventHelix Inc., Telecom Networking Design, Feb. 2015, pp. 1-5, Feb. 25, 2015.
(Continued)

*Primary Examiner* — Rhonda L Murphy
(74) *Attorney, Agent, or Firm* — Dentons US LLP

(57) ABSTRACT

Disclosed herein are a method and apparatus for transmitting/receiving random access signals. A user equipment (UE) transmits a random access preamble of a random access procedure through a random access channel (RACH) resource associated with a synchronization signal (SS) block. A base station (BS) receiving the random access preamble from a UE can transmit CSI-RSs to the UE. The BS may inform the UE that there will be CSI-RS transmission to the UE, during the random access procedure.

4 Claims, 12 Drawing Sheets

(51) Int. Cl.
*H04L 5/00* (2006.01)
*H04W 56/00* (2009.01)
*H04W 72/04* (2009.01)

(52) U.S. Cl.
CPC ....... *H04W 56/001* (2013.01); *H04W 72/042* (2013.01); *H04W 72/0446* (2013.01)

(56) References Cited

OTHER PUBLICATIONS

R1-152750:3GPP TSG RAN WG1 Meeting #81, Fukuoka, Japan, May 25-29, 2015, LG Electronics, "Discussion on specification impacts for beamformed CSI-RS-based schemes," pp. 1-3.
Mehdi Amirijoo et al., On Self-Optimization of the Random Access Procedure in 3G Long Term Evolution, In: Integrated Network Management-Workshops, 2009. Im '09. IFIP/IEEE International Symposium on, pp. 29-36, Aug. 7, 2009.

\* cited by examiner

METHOD AND USER EQUIPMENT FOR TRANSMITTING RANDOM ACCESS SIGNALS, AND METHOD AND BASE STATION FOR RECEIVING RANDOM ACCESS SIGNALS

This application is a National Stage Entry of International Application No. PCT/KR2017/012468 filed Nov. 6, 2017, which claims priority to U.S. Provisional Application Nos. 62/418,178 filed Nov. 6, 2016 and 62/482,653 filed Apr. 6, 2017, all of which are incorporated herein by reference.

TECHNICAL FIELD

The present invention relates to a wireless communication system, and more particularly, to a method and apparatus for transmitting/receiving random access signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more and more communication devices require greater communication capacity, there is a need for improved mobile broadband communication over legacy radio access technology (RAT). In addition, massive machine type communication (mMTC) for connecting multiple devices and objects to each other to provide various services anytime and anywhere is one of the major issues to be considered in next generation communication.

There is also a discussion on communication systems to be designed in consideration of reliability and latency-sensitive services/UEs. Introduction of next generation radio access technology is being discussed in terms of improved mobile broadband communication (eMBB), mMTC, and ultra-reliable and low latency communication (URLLC).

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a system for transmitting/receiving signals in a system supporting a new radio access technology is required.

The technical objects that can be achieved through the present invention are not limited to what has been particularly described hereinabove and other technical objects not described herein will be more clearly understood by persons skilled in the art from the following detailed description.

Technical Solution

Disclosed herein are a method and apparatus for transmitting/receiving random access signals. A user equipment (UE) transmits a random access preamble of a random access procedure through a random access channel (RACH) resource associated with a synchronization signal (SS) block. A base station (BS) receiving the random access preamble from a UE can transmit CSI-RSs to the UE. The BS may inform the UE that there will be CSI-RS transmission to the UE, during the random access procedure.

The object of the present invention can be achieved by providing a method for transmitting random access signals by a user equipment (UE). The method comprises: receiving, by the UE, an synchronization signal (SS) block; transmitting, by the UE, a RA preamble on a random access channel (RA) resource corresponding to the SS block; receiving, by the UE, downlink control information (DCI) indicating transmission of aperiodic CSI-RS; receiving, by the UE, a random access response (RAR) for the RA preamble; and reporting, by the UE, a downlink transmission beam based on the aperiodic CSI-RS in response to the RAR.

In another aspect of the present invention, provided herein is a method for receiving random access signals by a base station (BS). The method comprises: transmitting, by the BS, an synchronization signal (SS) block; receiving, by the BS, a RA preamble on a random access channel (RA) resource corresponding to the SS block from a UE; transmitting, by the BS, downlink control information (DCI) indicating transmission of aperiodic CSI-RS; transmitting, by the BS, a random access response (RAR) for the RA preamble to the UE; and receiving, by the BS, a report indicating a downlink transmission beam based on the aperiodic CSI-RS in response to the RAR from the UE.

In another aspect of the present invention, provided herein is a user equipment (UE) for transmitting random access signals. The user equipment includes a radio frequency (RF) unit, and a processor configured to control the RF unit. The processor is configured to: control the RF unit to receive an synchronization signal (SS) block; control the RF unit to transmit a RA preamble on a random access channel (RA) resource corresponding to the SS block; control the RF unit to receive downlink control information (DCI) indicating transmission of aperiodic CSI-RS; control the RF unit to receive a random access response (RAR) for the RA preamble; and control the RF unit to report a downlink transmission beam based on the aperiodic CSI-RS in response to the RAR.

In another aspect of the present invention, provided herein is a base station (BS) for receiving random access signals. The base station includes a radio frequency (RF) unit, and a processor configured to control the RF unit. The processor is configured to control the RF unit to transmit an synchronization signal (SS) block; control the RF unit to receive a RA preamble on a random access channel (RA) resource corresponding to the SS block from a UE; control the RF unit to transmit downlink control information (DCI) indicating transmission of aperiodic CSI-RS; control the RF unit to transmit a random access response (RAR) for the RA preamble to the UE; and control the RF unit to receive a report indicating a downlink transmission beam based on the aperiodic CSI-RS in response to the RAR from the UE.

In each aspect of the present invention, the UE may receive multiple RARs. The UE may select the RAR among the multiple RARs based on the aperiodic CSI-RS. The UE may report the downlink transmission beam using the selected RAR.

In each aspect of the present invention, the UE receives system information associated with the SS block. The system information may include configuration information of the aperiodic CSI-RS.

In each aspect of the present invention, the UE receives a physical downlink shared channel (PDSCH) based on the DCI. The PDSCH may carriy configuration information of the aperiodic CSI-RS.

In each aspect of the present invention, the DCI may include configuration information of the aperiodic CSI-RS.

In each aspect of the present invention, the BS may transmit, by multiple transmission and reception points (TRPs) of the BS, respective multiple RARs. The BS may receive the report indicating the downlink transmission beam by using one of the multiple RARs.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to one embodiment of the present invention, a low cost/complexity UE can perform communication with a BS at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a base station may be reduce.

In addition, with development of smart devices, a small amount of data or data which are less frequently generated may be efficiently transmitted/received.

Signals may be transmitted/received in a system supporting a new radio access technology.

According to an embodiment of the present invention, a small amount of data may be efficiently transmitted/received. It will be appreciated by persons skilled in the art that that the effects that can be achieved through the present invention are not limited to what has been particularly described hereinabove and other advantages of the present invention will be more clearly understood from the following detailed description.

MODE FOR INVENTION

Figure 1:
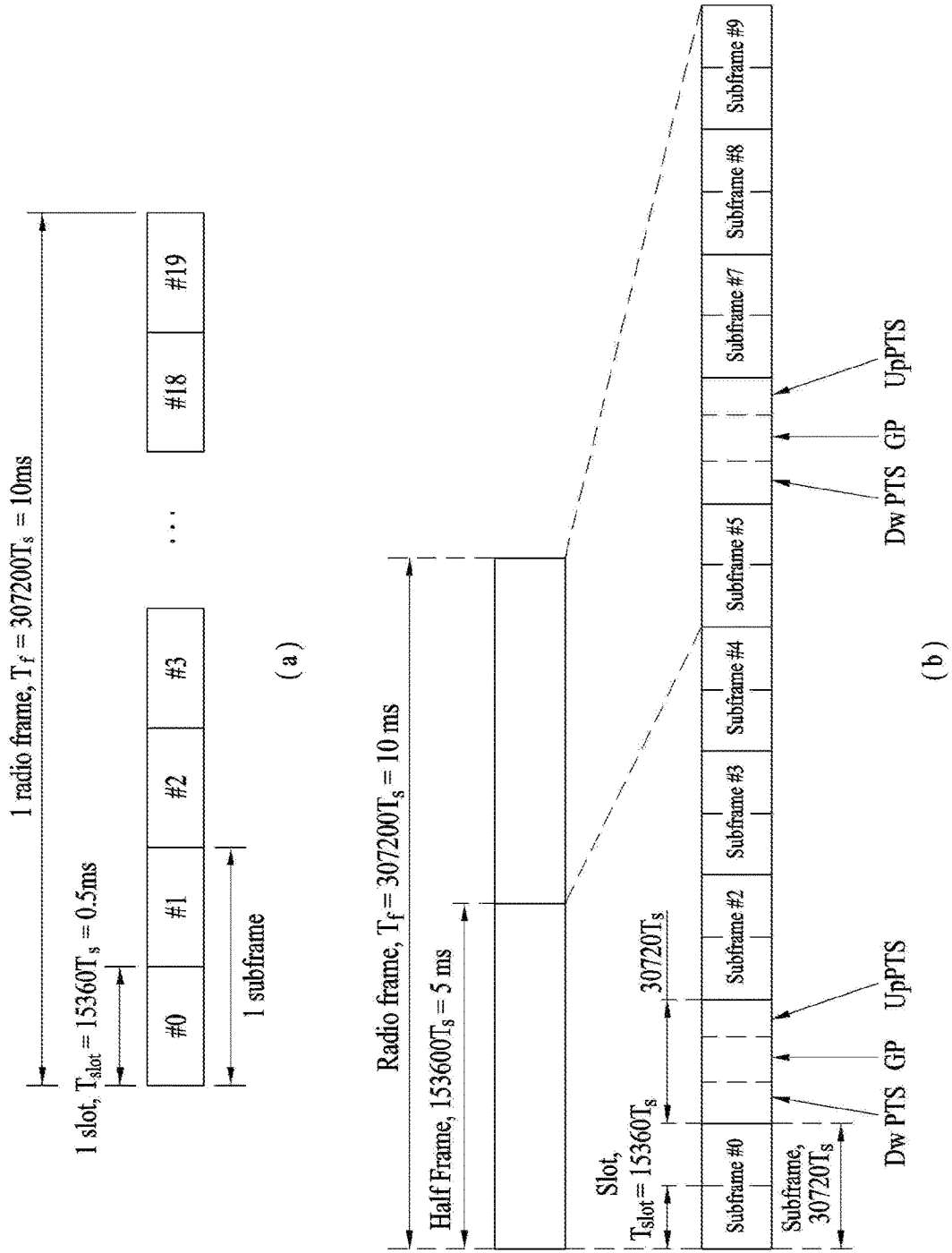
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. The BS in UTRAN is referred to as a node-B (NB), and the BS in E-UTRAN is referred to as an eNB. The BS in the new RAT is referred to as a gNB. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For the terms and techniques which are used herein but not specifically described, the 3GPP LTE/LTE-A standard documents, for example, 3GPP TS 36.211, 3GPP TS 36.212, 3GPP TS 36.213, 3GPP TS 36.300, 3GPP TS 36.321 and 3GPP TS 36.331, and the like may be referenced.

FIG. 1 illustrates the structure of a radio frame used in a LTE/LTE-A based wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s$=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

TTI refers to an interval during which data may be scheduled. For example, referring to FIGS. 1 and 3, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
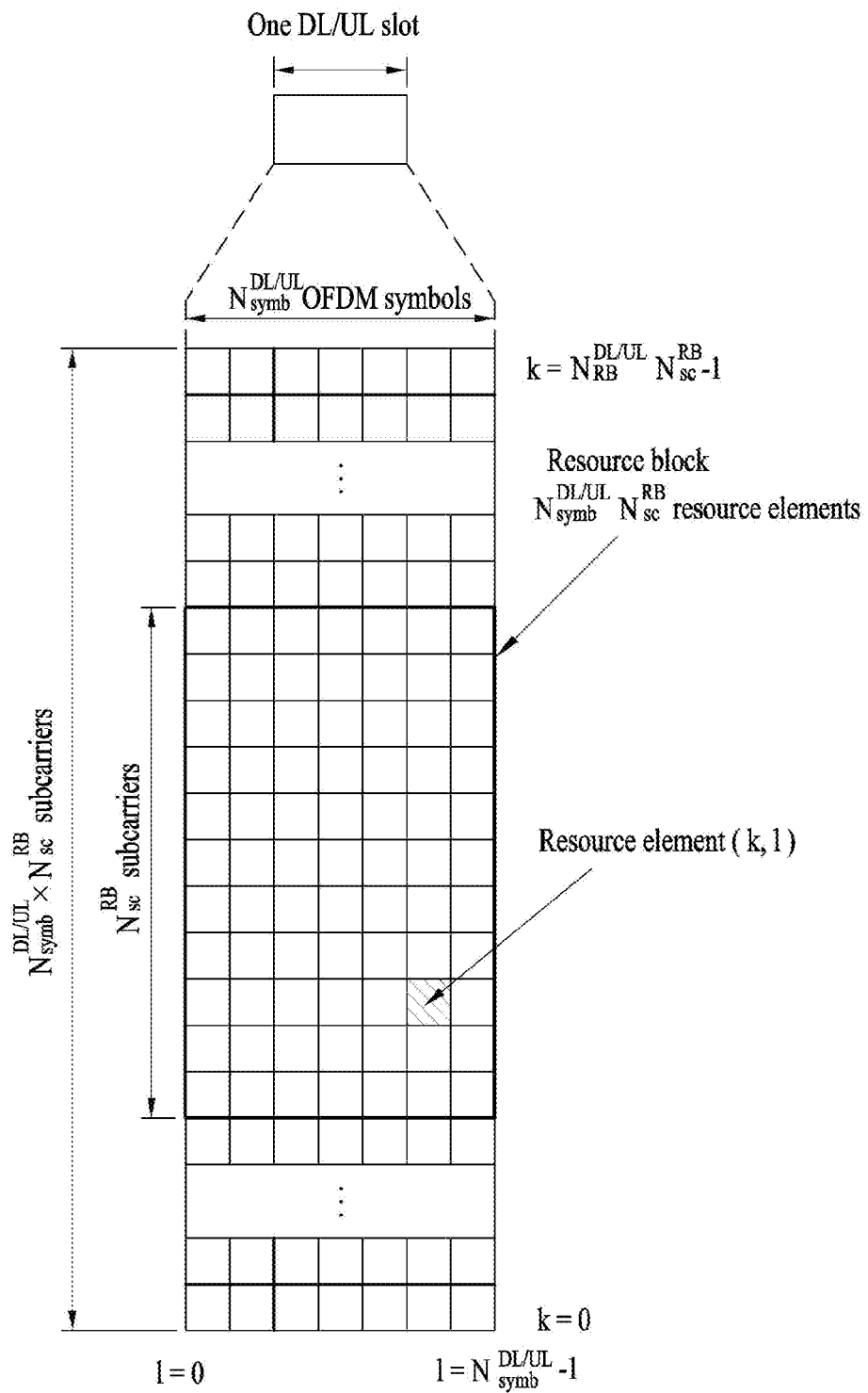
FIG. 2 illustrates the structure of a downlink (DL)/uplink (UL) slot in a wireless communication system.

FIG. 2 illustrates the structure of a DL/UL slot structure in a LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{FL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
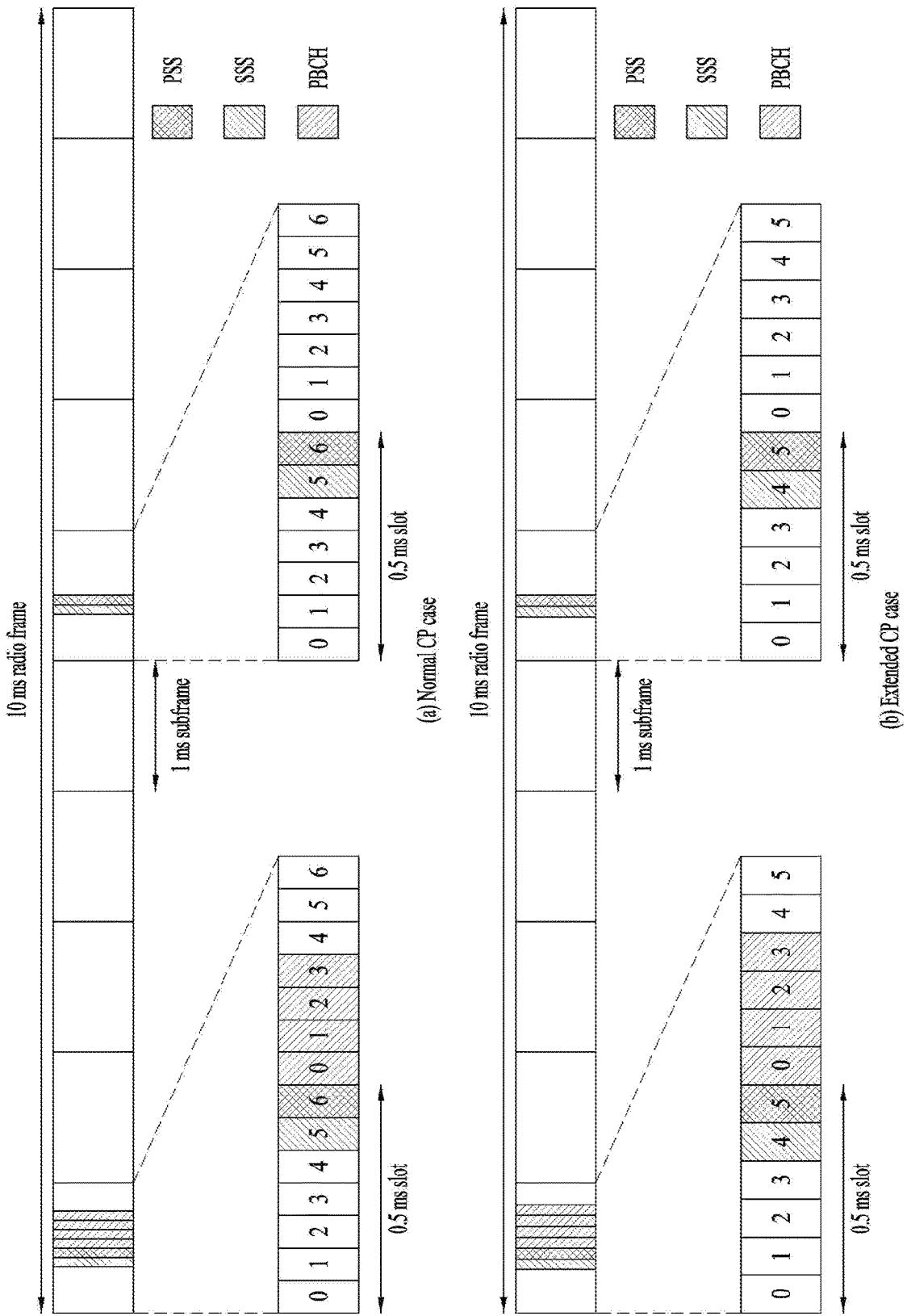
FIG. 3 illustrates a radio frame structure for transmission of a synchronization signal (SS) in a LTE/LTE-A based wireless communication system.

FIG. 3 illustrates a radio frame structure for transmission of a synchronization signal (SS) in a LTE/LTE-A based wireless communication system. Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

Upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

The UE, which has determined time and frequency parameters necessary for demodulating a DL signal and transmitting a UL signal at an accurate time by performing a cell search procedure using PSS/SSS, can communicate with the eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB 1), SIB Type 2 (SIB2), and SIB3 to SIB17 in accordance with the parameters.

The MIB includes most frequently transmitted parameters which are essential for initial access of the UE to a network of the eNB. The UE may receive the MIB through a broadcast channel (e.g. PBCH). The MIB includes a DL bandwidth (BW), PHICH configuration, and a system frame number (SFN). Accordingly, the UE may be explicitly aware of information about the DL BW, SFN, and PHICH configuration by receiving the MIB. Meanwhile, information which may be implicitly recognized by the UE through reception of the PBCH includes the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The SIB1 includes parameters needed to determine if a specific cell is suitable for cell selection, as well as information about time-domain scheduling of the other SIBs. The SIB1 is received by the UE through broadcast signaling or dedicated signaling.

DL carrier frequency and corresponding system bandwidth may be acquired by the MIB carried by the PBCH. UL carrier frequency and corresponding system bandwidth may be acquired by system information which is a DL signal. The UE which has received the MIB applies a DL BW value within the MIB to a UL-bandwidth (UL BW) until system information block type 2 (SystemInformationBlockType2, SIB2) is received if there is no valid system information stored in a corresponding cell. For example, the UE may identify a full UL system band, which may be used by itself for UL transmission, through UL-carrier frequency and UL-bandwidth information within the SIB2 by acquiring system information block type 2 (SystemInformationBlockType2, SIB2).

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

The contention-based random access procedure has the following four steps. Hereinafter, messages transmitted in steps 1 to 4 may be respectively referred to as Msg1 to Msg4.
  Step 1: RACH preamble (via PRACH) (UE to eNB)
  Step 2: Random access response (RAR) (via PDCCH and PDSCH) (eNB to UE)
  Step 3: Layer 2/Layer 3 message (via PUSCH) (UE to eNB)
  Step 4: Contention resolution message (eNB to UE)

The dedicated random access procedure includes the following three steps. Hereinafter, uplink transmission (i.e. step 3) corresponding to a RAR may be performed as a part of the random access procedure. The dedicated random access procedure can be triggered using a PDCCH (hereinafter, referred to as PDCCH order) used for an eNB to command RACH preamble transmission.
  Step 0: PACH preamble allocation through dedicated signaling (eNB to UE)
  Step 1: RACH preamble (via PRACH) (UE to eNB)
  Step 2: RAR (via PDCCH and PDSCH) (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc. The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg3 after transmission of Msg3.

The physical layer random access preamble, consists of a cyclic prefix of length $T_{CP}$ and a sequence part of length $T_{SEQ}$. The parameter values are listed in Table 1 and depend on the frame structure and the random access configuration. Higher layers (e.g. RRC) control the preamble format.

TABLE 1

| Preamble format | $T_{CP}$ | $T_{SEQ}$ |
| --- | --- | --- |
| 0 | $3168 \cdot T_s$ | $2 \cdot 24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (see Note) | $448 \cdot T_s$ | $4096 \cdot T_s$ |

NOTE:
Frame structure type 2 and special subframe configurations with UpPTS lengths $4380 \cdot T_s$ and $5120 \cdot T_s$ only.

The transmission of a random access preamble, if triggered by the MAC layer, is restricted to certain time and frequency resources. These resources are enumerated in increasing order of the subframe number within the radio frame and the physical resource blocks in the frequency domain such that index 0 correspond to the lowest numbered physical resource block and subframe within the radio frame. For frame structure type 1 with preamble format 0-3, there is at most one random access resource per subframe. For frame structure type 2 with preamble formats 0-4, there might be multiple random access resources in an UL subframe (or UpPTS for preamble format 4) depending on the UL/DL configuration.

Figure 4:
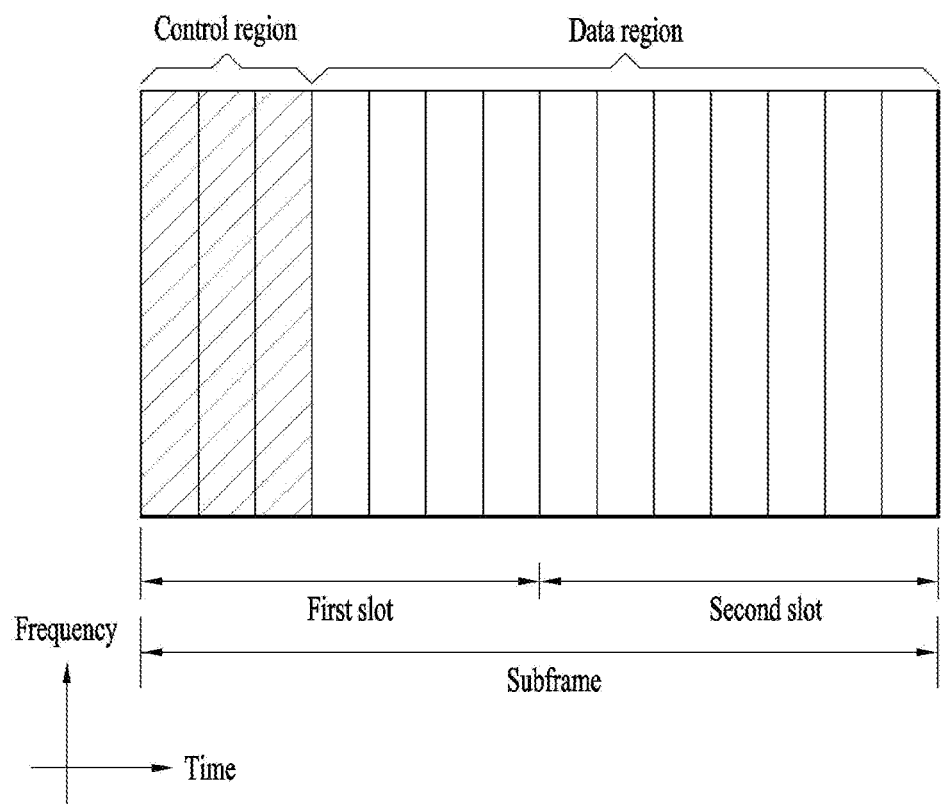
FIG. 4 illustrates the structure of a DL subframe used in a wireless communication system.

FIG. 4 illustrates the structure of a DL subframe used in a LTE/LTE-A based wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE/LTE-A include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH carries a control format indicator (CFI), which indicates any one of values of 1 to 3. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode. The UE may decode a PDSCH in accordance with DCI based on the DCI format successfully decoded. A transmission mode is semi-statically configured for the UE by the upper layer such that the UE may receive PDSCHs transmitted according to one of a plurality of predetermined transmission modes. The UE attempts to decode the PDCCH only in DCI formats corresponding to the transmission mode thereof. For example, tries to decode PDCCH candidates of a UE-specific search space (USS) to a fallback DCI (e.g., DCI format 1A), and tries to decode PDCCH candidates of a common search space (CSS) and the USS to a DCI format specific to a transmission mode with which the UE is configured. In other words, in order to maintain the computational load of the UE according to blind decoding attempts below a certain level, not all DCI formats are simultaneously searched by the UE.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$. The control region of each serving cell consists of a set of CCEs, numbered from 0 to $N_{CCE,k}-1$, where $N_{CCE,k}$ is the total number of CCEs in the control region of subframe k. A PDCCH consisting of n consecutive CCEs may only start on a CCE fulfilling i mod n=0, where i is the CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space S"k at aggregation level L{1,2,4,8} is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 5:
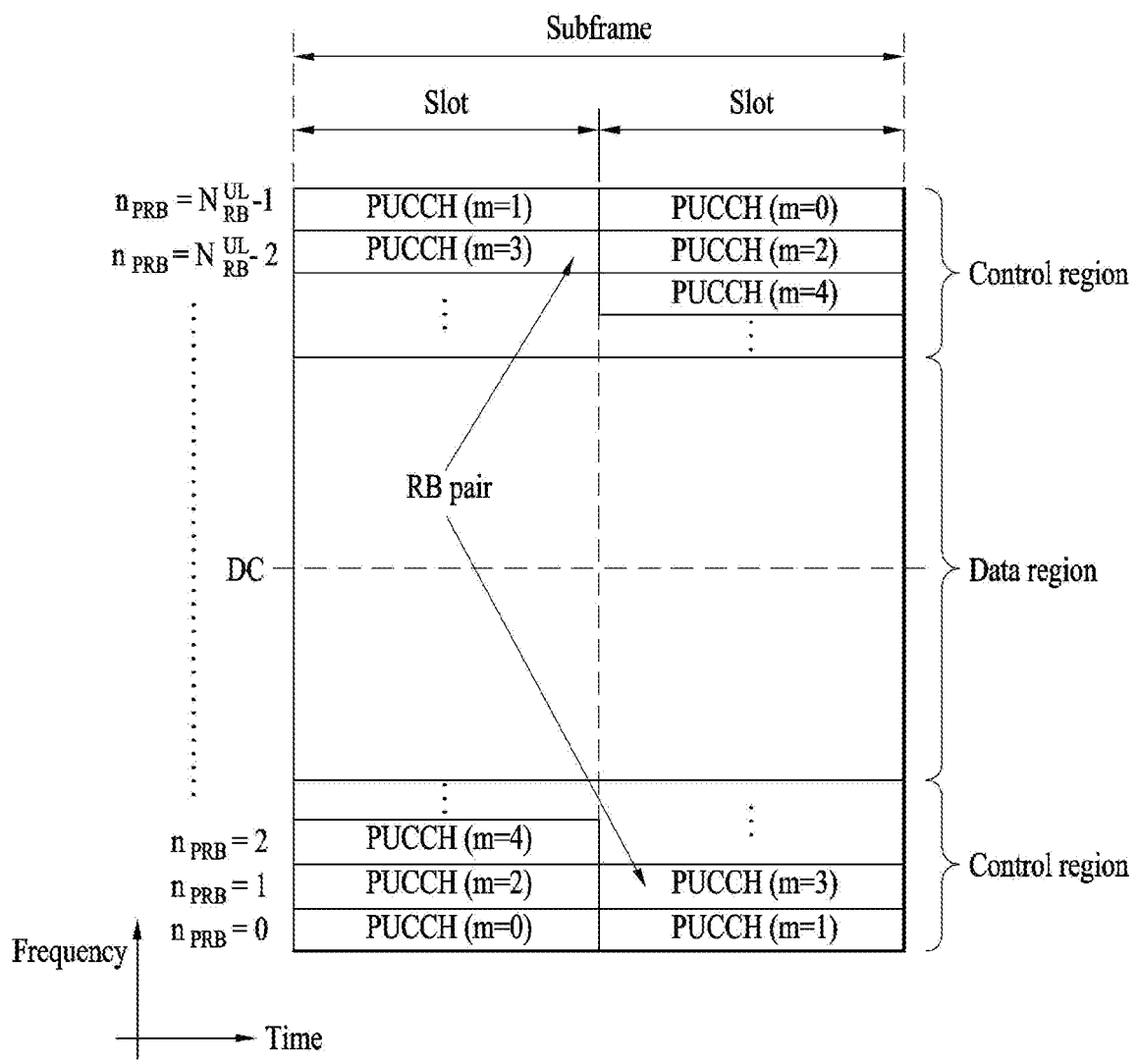
FIG. 5 illustrates the structure of a UL subframe used in a wireless communication system.

FIG. 5 illustrates the structure of a UL subframe used in a LTE/LTE-A based wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.
  Scheduling request (SR): SR is information used to request a UL-SCH resource and is transmitted using an on-off keying (OOK) scheme.
  HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.
  Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH)

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs), or multiple sub-bands for MTC may be provided in one subframe to multiplex MTC UEs in the subframe such that the UEs use different sub-bands or use the same sub-band which is not a sub-band consisting of the 6 center PRBs.

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy PDCCH/EPDCCH, may be introduced for the MTC UE.

A data channel (e.g., PDSCH, PUSCH) and/or control channel (e.g., M-PDCCH, PUCCH, PHICH) may be transmitted across multiple subframes to implement coverage enhancement (CE) of the UE, using a repetition technique or TTI bundling technique. On behalf of the CE, a control/data channel may be transmitted additionally using techniques such as cross-subframe channel estimation and frequency (narrowband) hopping. Herein, the cross-subframe channel estimation refers to a channel estimation technique using not only a reference signal in a subframe having a corresponding channel but also a reference signal in neighboring subframe(s).

The MTC UE may need CE up to, for example, 15 dB. However, not all MTC UEs are present in an environment which requires CE. In addition, the QoS requirements for MTC UEs are not identical. For example, devices such as a sensor and a meter have a low mobility and a small amount of data to transmit/receive and are very likely to be positioned in a shaded area. Accordingly, such devices may need high CE. On the other hand, wearable devices such as a smart watch may have mobility and are very likely to have a relatively large amount of data to transmit/receive and to be positioned in a place other than the shaded area. Accordingly, not all MTC UEs need a high level of CE, and the required capability may depend on the type of an MTC UE.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 6:
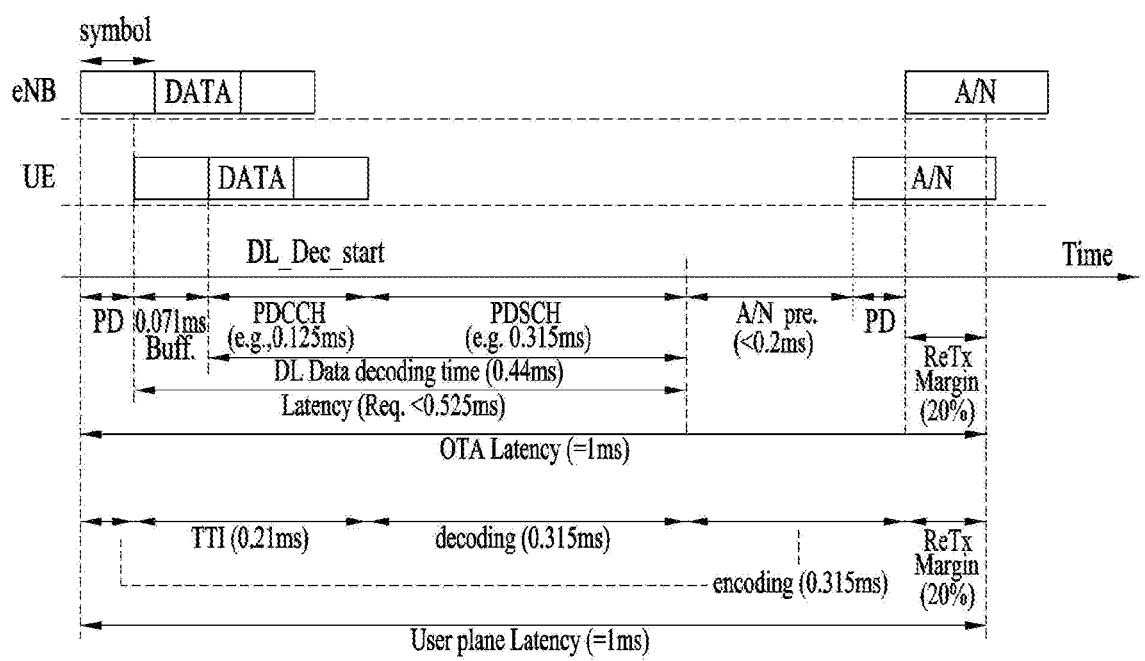
FIG. 6 illustrates the length of a transmission time interval (TTI) which is needed to implement low latency.

FIG. 6 illustrates the length of a transmission time interval (TTI) which is needed to implement low latency.

Referring to FIG. 6, a propagation delay (PD), a buffering time, a decoding time, an A/N preparation time, an uplink PD, and an OTA (over the air) delay according to a retransmission margin are produced while a signal transmitted from the eNB reaches the UE, the UE transmits an A/N for the signal, and the A/N reaches the eNB. To satisfy low latency, a shortened TTI (sTTI) shorter than or equal to 0.5 ms needs to be designed by shortening the TTI, which is the smallest unit of data transmission. For example, to shorten the OTA delay, which is a time taken from the moment the eNB starts to transmit data (PDCCH and PDSCH) until the UE completes transmission of an A/N for the data to the eNB, to a time shorter than 1 ms, the TTI is preferably set to 0.21 ms. That is, to shorten the user plane (U-plane) delay to 1 ms, the sTTI may be set in the unit of about three OFDM symbols.

While FIG. 6 illustrates that the sTTI is configured with three OFDM symbols to satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI, namely the channel band or system band of the TTI. In contrast with the legacy LTE/LTE-A system, in which the length of a TTI is fixed to 1 ms, and thus all UEs and eNB perform signal transmission and reception in units of 1 ms, the present invention supports a system which has multiple TTI lengths, and one UE and one eNB may transmit and receive a signal using multiple TTI lengths. In particular, the present invention proposes a method of enabling the eNB and UE to communicate with each other while supporting various TTI lengths and variability when the TTI length is variable and a method of performing multiplexing for each channel and UE. While description of the present invention below is based on the legacy LTE-/LTE-A system, it is also applicable to systems other than the LTE/LTE-A system or RAT.

Embodiments of the present invention described below may be applied to a new radio access technology (RAT) system in addition to the 3GPP LTE/LTE-A system. As more and more communication devices demand larger communication capacity, there is a need for improved mobile broadband communication compared to existing RAT. Also, massive MTC, which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC, and URLLC (Ultra-Reliable and Low Latency Communication), is being discussed. In the present invention, this technology is referred to as new RAT for simplicity.

<Self-Contained Subframe Structure>

Figure 7:
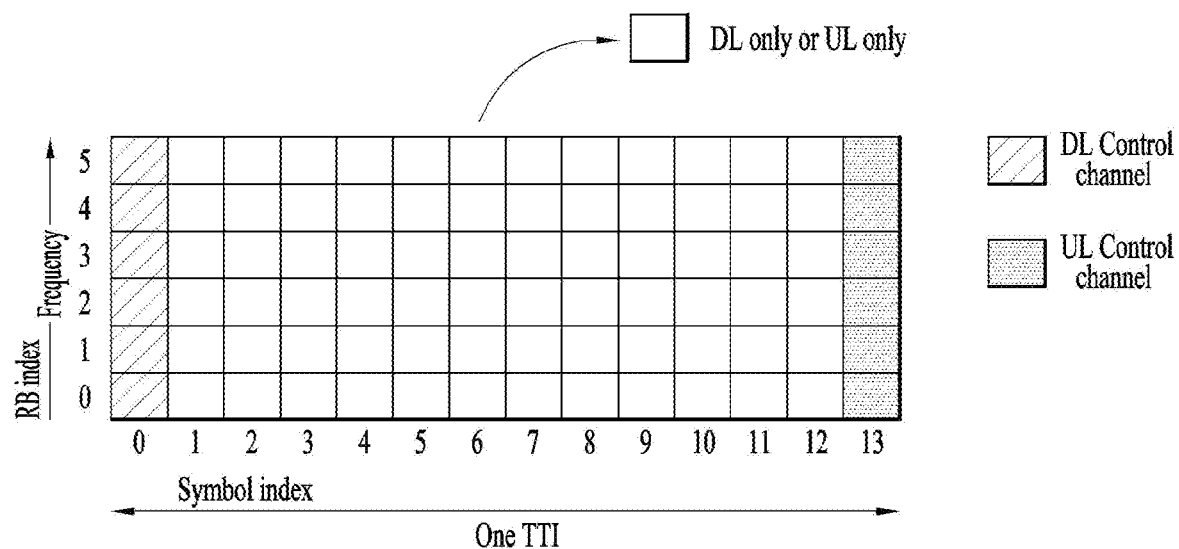
FIG. 7 illustrates a self-contained subframe structure.

FIG. 7 illustrates a self-contained subframe structure.

In order to minimize the latency of data transmission in the TDD system, a self-contained subframe structure is considered in the new fifth-generation RAT.

In FIG. 7, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 7, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

For example, a new RAT, referred to as mmWave and 5G, is expected to have a very large system bandwidth. Depending on the frequency band, 5 MHz, 10 MHz, 40 MHz, 80 MHz, etc. may have to be supported as minimum system bandwidth. The minimum system bandwidth may vary depending on the basic subcarrier spacing (i.e., default subcarrier spacing) of the system. For example, when the basic subcarrier spacing is 15 kHz, the minimum system bandwidth is 5 MHz. When the basic subcarrier spacing is 30 kHz, the minimum system bandwidth is 10 MHz. When the basic subcarrier spacing is 120 kHz, the minimum system bandwidth is 40 MHz. When the basic subcarrier spacing is 240 kHz, the minimum system bandwidth may be 80 MHz. The new RAT is designed for sub-6 GHz and bands higher than or equal to 6 GHz and is also designed to support multiple subcarriers within a system to support various scenarios and use cases. When the subcarrier length is changed, the subframe length is also correspondingly reduced/increased. For example, one subframe may be defined as a short time such as 0.5 ms, 0.25 ms, or 0.125 ms. Higher frequency bands (e.g., higher than 6 GHz) may be used in the new RAT system, and a subcarrier spacing wider than the existing subcarrier spacing of 15 kHz in the legacy LTE system is expected to be supported. For example, when the subcarrier spacing is 60 kHz, one resource unit (RU) may be defined by 12 subcarriers on the frequency axis and one subframe on the time axis. In the new RAT system, a plurality of subcarrier spacings (e.g., 15 kHz, 30 kHz, 60 kHz, 120 kHz and 240 kHz subcarrier spacing) which are an integer multiple (or an n-th power of 2) of a default subcarrier spacing may be used.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

Figure 8:
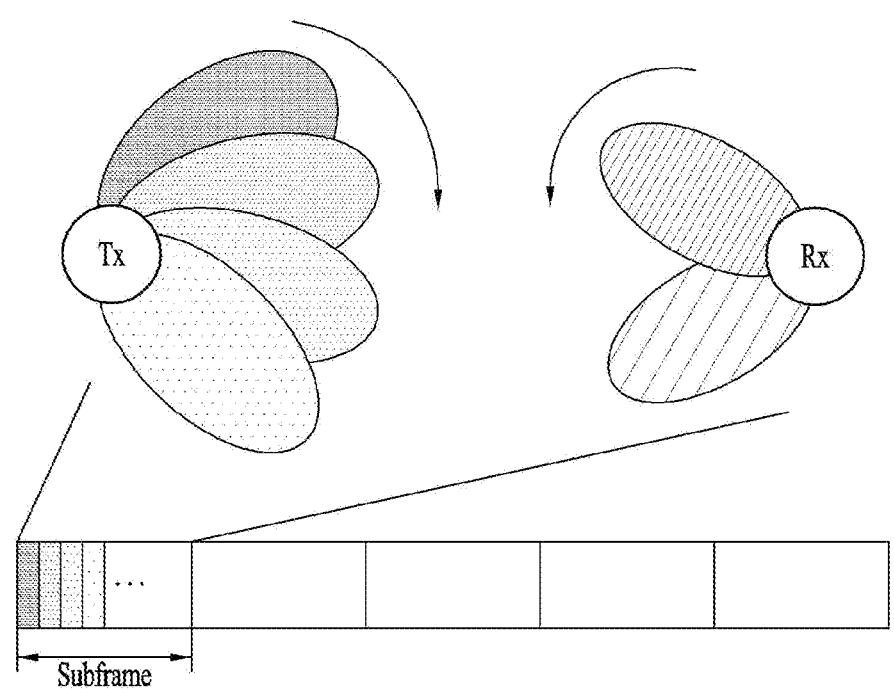
FIG. 8 illustrates an example of application of analog beamforming.

FIG. 8 illustrates an example of application of analog beamforming.

Referring to FIG. 8, a signal may be transmitted/received by changing the direction of a beam over time. While a non-UE-specific signal (e.g., PSS/SSS/PBCH/SI) is transmitted omni-directionally in the LTE/LTE-A system, a scheme in which an eNB employing mmWave transmits a cell-common signal by omni-directionally changing the beam direction is considered. Transmitting/receiving signals by rotating the beam direction as described above is referred to as beam sweeping or beam scanning. For example, assuming that the eNB can have a maximum of N beam directions, the eNB may transmit PSS/SSS/PBCH per each of the N beam directions. That is, the eNB transmits synchronization signals such as PSS/SSS/PBCH for each direction while sweeping beam directions that the eNB can have or support. Alternatively, when the eNB can form N beams, several beams may be bundled into one beam group, and PSS/SSS/PBCH may be transmitted/received per beam group. At this time, one beam group includes one or more beams. The bundle of PSS/SSS/PBCH for a beam group is called SS block. In terms of transmission of synchronous signals, an "SS block" is defined as a container for carrying PSS, SSS, PBCH and/or other system information in the NR. That is, the SS block is formed by a combination of the synchronization signals.

In the multiple beam environments, the repetition of the PRACH preamble or the beam sweep can be considered, depending on Tx/Rx reciprocal capability of the UE and/or the transmission and reception point (TRP) (e.g., gNB). The Tx/Rx reciprocal capability is also referred to as Tx/Rx beam correspondence at TRP and UE. If the Tx/Rx beam correspondence of TRP and/or UE is not maintained in multiple-beam environments, the UE may not be able to shoot the uplink signal in the direction of the beam that the UE itself received the downlink signal. This is because there is a possibility that the optimum path of UL and the optimum path of DL may be different. Tx/Rx beam correspondence at a TRP holds if at least one of the followings is satisfied: the TRP is able to determine a TRP Rx beam for the uplink reception based on UE's downlink measurement on TRP's one or more Tx beams, and the TRP is able to determine a TRP Tx beam for the downlink transmission based on TRP's uplink measurement on TRP's one or more Rx beams. Tx/Rx beam correspondence at a UE holds if at least one of the followings is satisfied: the UE is able to determine a UE Tx beam for the uplink transmission based on UE's downlink measurement on UE's one or more Rx beams, the UE is able to determine a UE Rx beam for the downlink reception based on TRP's indication based on uplink measurement on UE's one or more Tx beams, and capability indication of UE beam correspondence related information to a TRP is supported.

In the present invention, provided is a RACH procedure considering Tx/Rx beam reciprocity at TRP and UE, i.e., Tx/Rx beam correspondence at TRP and UE. In the present invention, an initial access procedure in mmWave, which is different from that of the legacy LTE system due to the characteristics of the analog beamforming, is proposed first. Further proposed are the operations of the UE and the eNB, and a method for signaling information between the UE and the eNB.

As mentioned before, FIG. 7 illustrates a subframe structure where a DL control channel is time division multiplexed with DL data or UL data onto a wideband. Referring to FIG. 7, a DL control channel on a wide band may be transmitted by time division multiplexing (TDM) with DL data or UL data. The eNB may transmit the DL control channel(s) over the entire band, but a UE may receive a DL control channel thereof in a specific band rather than the entire band. Here, the DL control channel refers to control information, which includes not only DL specific information such as DL scheduling but also information on cell configuration that the UE should know and UL specific information such as UL grant, transmitted from the eNB to the UE.

In order for a UE to make association with a specific system and receive a service from the specific system, the first operation that the UE has to perform is to obtain the time and frequency synchronization of the specific system, receive basic system information, and adjust uplink timing. This is generally called an initial access procedure. The initial access procedure generally includes a synchronization procedure and a RACH procedure. In the legacy LTE system, the synchronization procedure using PSS, SSS and PBCH may be summarized as follows:

PSS: symbol timing acquisition, frequency synchronization, cell ID detection within cell ID group (3 hypotheses);

SSS: cell ID group detection (168 hypotheses), 10 ms frame boundary detection, CP detection (2 hypotheses);

PBCH decoding: antenna configuration, 40 ms timing detection, system information, system bandwidth etc.

In other words, a UE acquires OFDM symbol timing and subfame timing by using PSS and SSS on a cell, and also obtain a cell ID of the cell by using the PSS and the PSS, and acquires system information important to the corresponding system by descrambling PBCH of the cell based on the cell ID and decoding the descrambled PBCH.

In order to support seamless connection to a UE with mobility, multiple TRP operation within a cell is considered.

In other words, multiple cells are deployed and each cell may include multiple TRPs which shares the cell ID. In a very initial state, a UE firstly tries to get time/frequency synchronization based on the synchronization signal (SS) detection and possibly the UE acquires the cell ID, and then UE decodes PBCH to get the essential system information. SS and PBCH would be transmitted with a single frequency network (SFN) manner from multiple TRPs sharing a cell ID. A single-frequency network or SFN is a broadcast network where several TRPs simultaneously send the same signal over the same frequency channel. Hereinafter, the expression "SFNed" transmission of a signal means that the signal is transmitted simultaneously transmitted using a same time-frequency resource by multiple TRPs.

On the other hand, due to multiple beam operation especially for above 6 GHz, association between DL broadcast channel/signal and RACH resources may be considered. In terms of association with DL broadcast channel/signal and RACH resource, it should be studied whether the DL broadcast channel/signal is also cell-specifically transmitted with SFN manner from multiple TRPs/multiple beams or TRP/beam specific channel/signal. A RACH resource includes a time/frequency resource on which PRACH preamble can be transmitted, a time/frequency resource on which a RAR from a gNB can be transmitted, PRACH preamble information, and etc. More specifically, a RACH resource may include beam directional information corresponding to DL broadcast channel/signal. PSS/SSS/PBCH direction and the resource would be different per the direction.

In the present invention, the RACH resource may be the time/frequency resource on which RACH messages are to be transmitted.

<I. Multiple TRPs Considerations>

It is natural that SS/PBCH is cell specifically transmitted irrespective of whether single TRP or multiple TRPs are deployed in a cell.

On receiving SS and PBCH, a UE tries to perform a RACH procedure to get UL timing synchronization and connection to the network. Prior to transmit a PRACH preamble, the UE needs to receive a PRACH configuration including a PRACH resource, a PRACH preamble, transmission power/power ramping step, and etc. The PRACH configuration information is too heavy to be included in a PBCH, and this is preferably transmitted within system information block (SIB).

Depending on the design criteria, SIB carrying PRACH configuration can be cell-specific or beam-specific. Hereinafter, the cell-specific SIB transmission and the corresponding initial acquisition procedure are described first, and then beam-specific SIB transmission and initial acquisition procedure is described next.

1. Cell-Specific SIB (Wide-Beam Based RACH Procedure)

Figure 9:
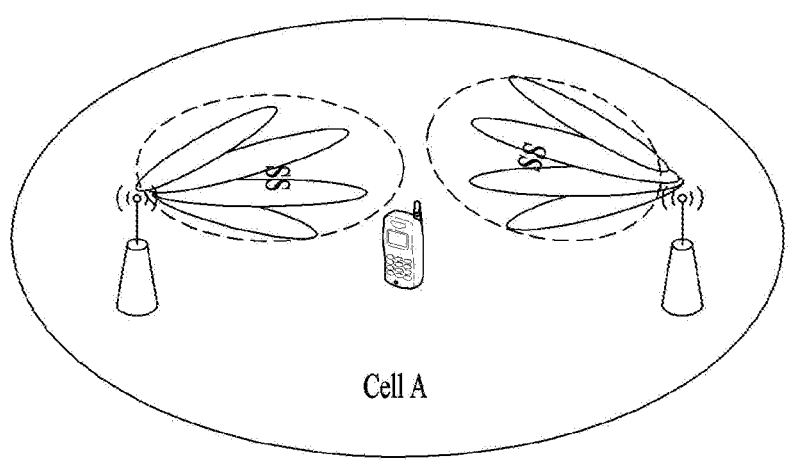
FIG. 9 illustrates an example of multiple TRPs with the same cell ID.

FIG. 9 illustrates an example of multiple TRPs with the same cell ID. The multiple TRPs transmit SS, and the SS is transmitted in a SFN manner in order to increase detection probability. Referring to FIG. 9, for example, TRP1 and TRP2 transmit the same SS on a same time-frequency SS resource, since they share the same cell ID. PBCHs from multiple TRPs are expected to be transmitted in a similar way to SS transmission, SFNed. Assuming analog beamforming at each TRP, SS transmission beams will be swept as symbols change within SS burst to cover a wide area. On the other hand, within a symbol, there can be multiple beams from a TRP and these beams are not clearly identified at UE side unless a beam specific RS is transmitted. The point is that, assuming SFNed transmission of SS and PBCH, a UE is not able to identify a beam or TRP by detection of SS/PBCH without beam identification information since RACH resources are to be associated with the SFNed beams, i.e. symbol index or SS block index. Multiple TRPs or multiple analog beams per TRP may share PRACH resources. The beam identification procedure can be performed in the middle of a RACH procedure or after completion of the RACH procedure.

Figure 10:
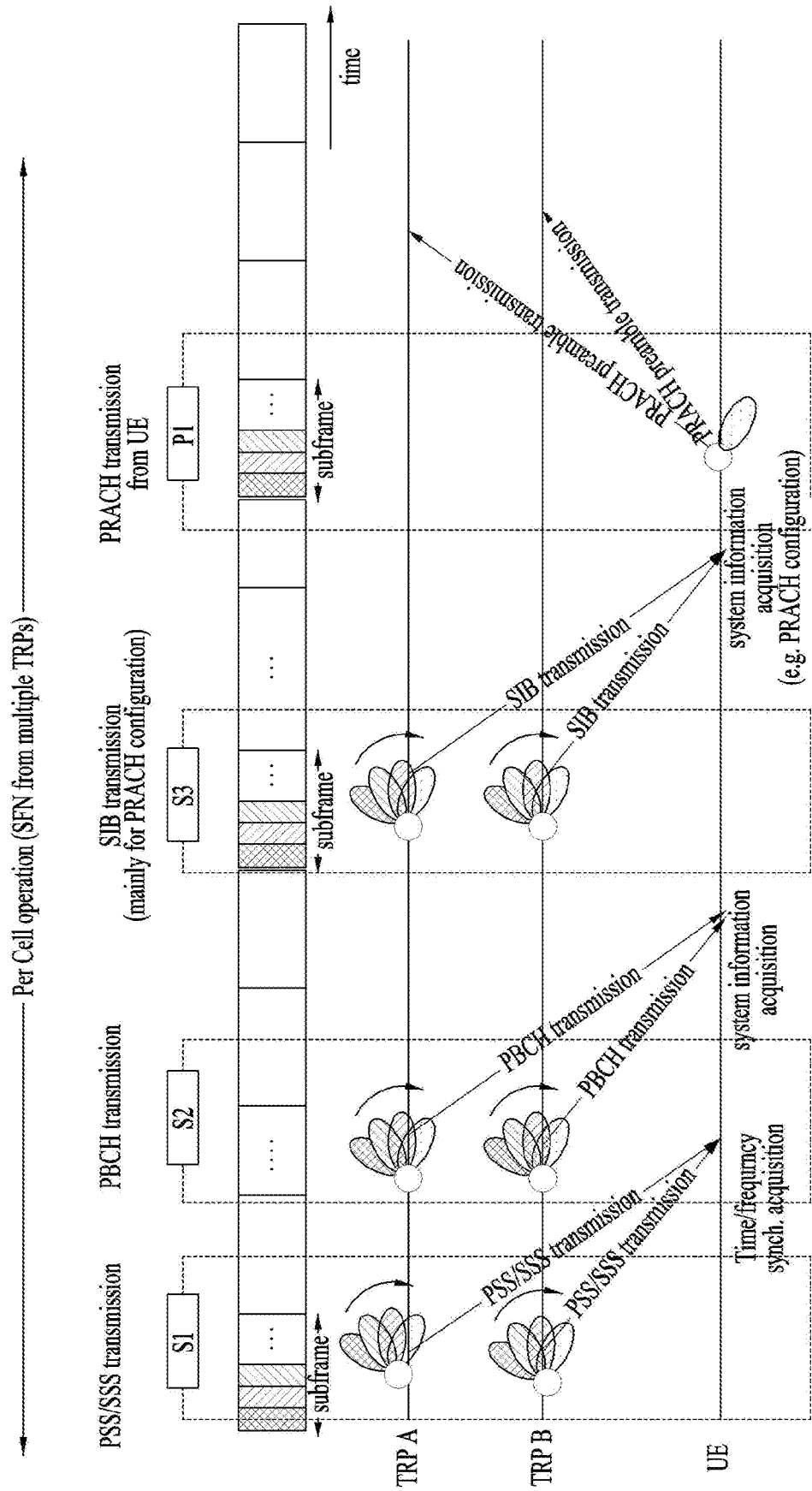
FIG. 10 shows a possible initial acquisition/access procedure for multiple beam operation according to the present invention.

FIG. 10 shows a possible initial acquisition/access procedure for multiple beam operation according to the present invention.

PRACH resources are assumed to be associated with the SFNed SS/PBCH and SIB transmission beam direction. In FIG. 10, steps S1, S2, and S3 can happen within the same subframe. PBCH may indicate SIB transmission information including a time and frequency location where SIB(s) are to be transmitted. Here, a UE may assume the same DM-RS (including DM-RS sequence, number of DM-RS ports, and transmission schemes) for PBCH demodulation and SIB demodulation. Or, DM-RS sequences for PBCH and SIB may differ but UE can easily extract the sequence information for the SIB from the DM-RS sequence used for PBCH demodulation.

In this case, the UE transmits a PRACH preamble based on the received SS/PBCH/SIB direction on the RACH resource associated with a SS/PBCH/SIB whose beam is relatively wide, while the UE does not have any information on the narrow beam(s). Here, SIB includes configuration information on the RACH resources, which is possibly per relatively wide beam (i.e. a combined beam of multiple narrow beams and beams from multiple TRPs) and multiple TRPs share the RACH resources. The SIB also carries the beam RS information per TRP (e.g., total number of beam RS ports, the number of beam RS ports per symbol or TRP, beam RS sequences, and etc.).

Using PRACH configuration on the RACH resources, a UE transmits a PRACH preamble possibly targeting multiple TRPs because PRACH configuration/resources are not specific to a TRP or beam. Multiple TRPs may receive a PRACH preamble from a UE, and a single or part of TRP(s) may respond to the PRACH preamble.

Cell-Based RACH Configuration

In case of cell-specific SIB(s), a RACH resource is also cell-specifically defined and it is associated with the received SS/PBCH. If multiple TRPs are deployed in a cell, multiple TRPs share the RACH resource considering SFNed transmission of SS/PBCH and transmission of PRACH preamble on a specific RACH resource tied to SS/PBCH may implicitly target multiple TRPs. A UE is not able to identify a TRP upon detection of SS/PBCH. Upon receiving a PRACH preamble from UE, a single RAR can be transmitted from a TRP receiving the PRACH preamble with the best received quality. It is effectively the same in the RACH procedural aspect at a UE side in case multiple TRPs transmit a RAR with the same contents. Alternatively, a network responses with RARs (i.e., Msg2) on the received PRACH preamble. Multiple TRPs may respond with RAR on the received single PRACH preamble possibly with different time instances within a RAR reception window at the UE side. In the RAR, TRP ID can be included in order for a UE to differentiate TRPs.

A UE may receive multiple RARs on a single PRACH preamble. It should be defined whether the UE should response with all of the received RARs or can selectively response on the received RARs. There could be several options on the RACH procedures on multiple RARs per single PRACH preamble.

Option 1: UE Responds on the Multiple RARs

Receiving multiple RARs within a RAR window on a single PRACH preamble transmission, a UE may transmit multiple message 3 (Msg3) based on the respective commands in the multiple RARs. Contents (e.g., TRP ID if included, time-frequency resource for Msg3 transmission, timing advance (TA) command, and etc.) from different TRPs can be different, but contention resolution ID for the PRACH preamble should be the same in different RARs. The UE may include best N TRP IDs in its Msg3, and the network can decide which TRP will be serving the UE based on the received TRP IDs from the UE, the network load, and etc. If the network decided a TRP, only the decided/selected TRP can transmit Msg4 to the UE, and this resolve contention of UL transmission and TRP competition as well.

Option 2: UE Responds on a Single RAR

In this option, a UE can resolve TRP competition by selecting one RAR for Msg3 transmissions based on the best received quality. The UE selects its serving TRP by responding to a single RAR chosen based on the received signal quality but in this case the TRP can be transparent at the UE side if the TRP ID is not provided in RARs.

The above described present invention associated with multiple TRPs can be applied to multiple beams in a similar manner. For example, multiple TRPs in the above described present invention may be replaced with multiple beams.

2. Beam-Specific SIB (Narrow-Beam Based RACH Procedure)

Figure 11:
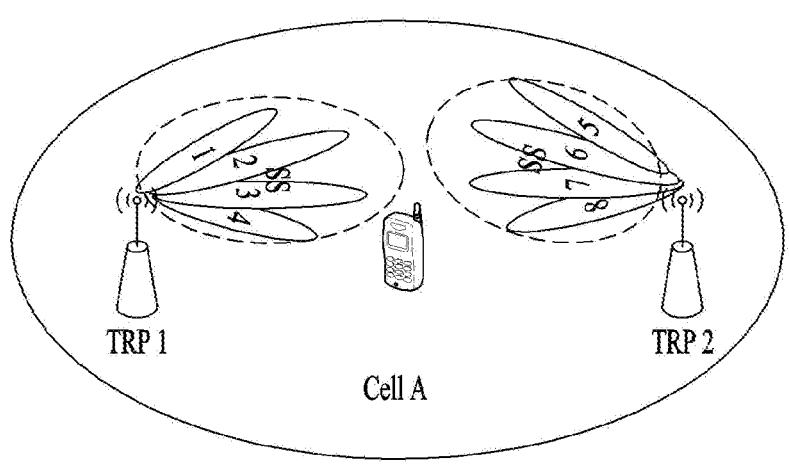
FIG. 11 illustrates another example of multiple TRPs with the same cell ID.

FIG. 11 shows another exemplary deployment of multiple TRPs sharing a cell ID. FIG. 11 is different from FIG. 9 in that TRP or beam identification is enabled by RS transmission per TRP or beam before PRACH configuration. If TRP ID/RS or beam ID/RS is transmitted, a UE is able to identify best serving TRPs or beams after detecting SS and decoding PBCH, which are SFNed transmitted. Due to PRACH resources are associated with the TRPs or beams, the RACH procedure followed is performed per TRP or beam level.

For the beam identification, a beam specific RS should be transmitted from each TRP and the RS information should be known to UE a priori. To support a beam based RACH procedure, PRACH configuration per beam (or per TRP) should be provided, and the PRACH configuration may be carried by SIB. Here, we consider beam sweeping of a SIB with beam specific RS transmission per symbol, and the SIB may be specific to a TRP (or group of beams).

Figure 12:
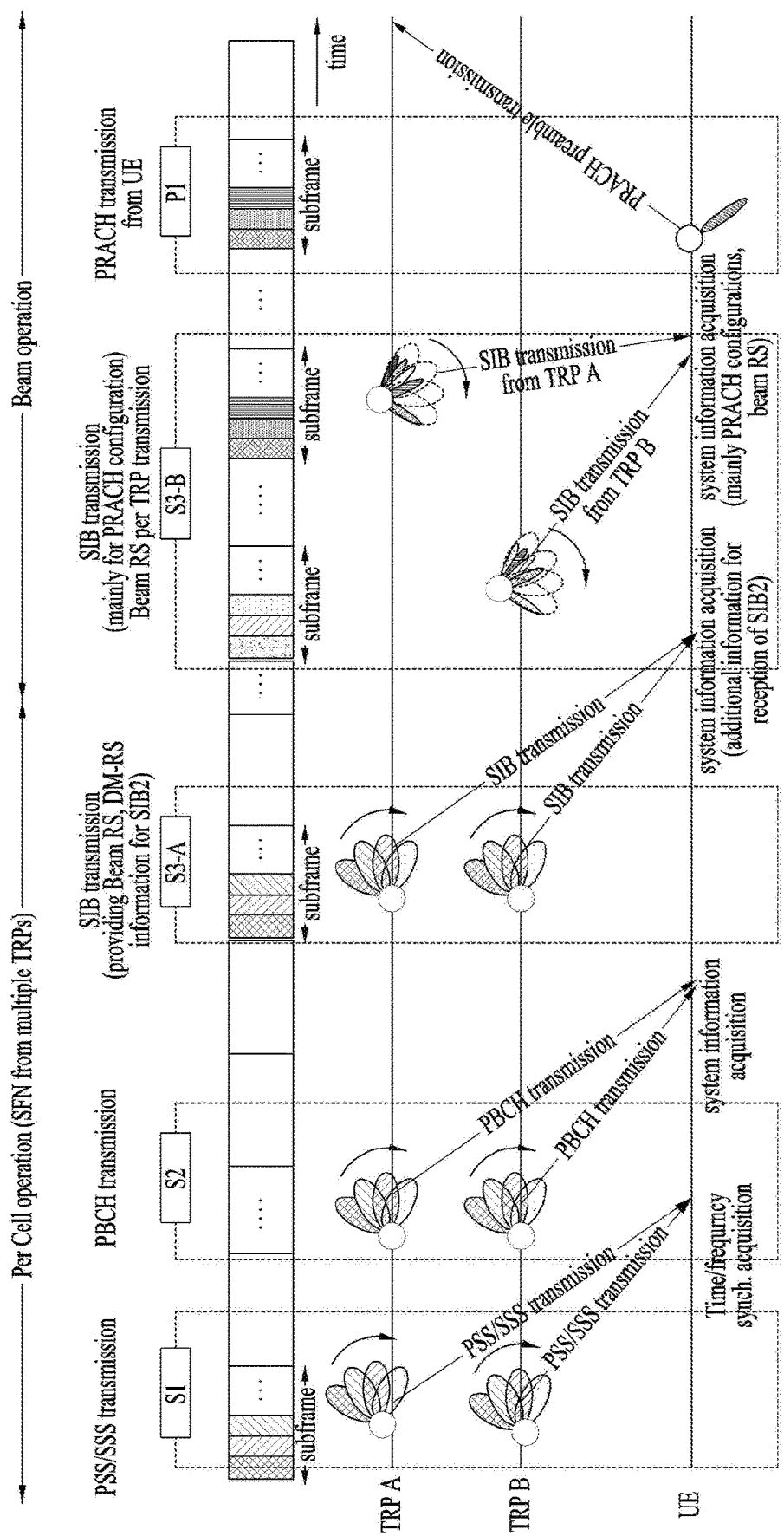
FIG. 12 shows a possible initial acquisition/access procedure for multiple beam operation according to the present invention.

FIG. 12 shows another possible initial acquisition/access procedure for multiple beam operation according to the present invention.

By receiving beam swept SIB and beam-specific RS, a UE is able to identify its best beam(s) and corresponding PRACH resource(s)/configuration(s).

For receiving the beam swept SIB and beam specific RS, a UE has to know the time-frequency location of SIB per TRP, DM-RS information for demodulation of SIB, the number of beam-specific RS ports per TRP and corresponding RS information.

In FIG. 12, it is assumed that RACH resources are associated with specific analog beam directions. In other words, PRACH configurations/resources are associated with a TRP or beam(s), which is preferably narrower than the SS/PBCH beams. In FIG. 12, it is depicted that SIB1 is transmitted similar to SS/PBCH, and the SIB1 may carry beam RS information and DM-RS for SIB2. For convenience, SIB1 is referred to as the system information that a UE has to decode right after PBCH, and SIB2 as the system information that a UE has to decode to obtain PRACH configuration and beam identification. For SIB1, similar to SIB demodulation in FIG. 9, a UE may assume that the same DM-RS information used for PBCH demodulation is used for SIB1 demodulation. In addition, SIB1 carries beam RS information per TRP or beam. After decoding SIB1, the UE gets ready to get PRACH configuration information from SIB2 and beam identification based on the beam RS information provided by SIB 1.

SIB2 provides PRACH configuration information/resources per TRP or beam, and it is transmitted with beam sweeping manner at each TRP and beam RSs are also transmitted together with the SIB2 in order for UE(s) to identify best beam directions. In FIG. 12, SIB2 transmission is per TRP with different time instance, and of course, SIB2 from different TRPs can be transmitted simultaneously. In order to reduce network signaling overhead, information of SIB2 may differ per TRP, and it is preferable to tag TRP ID in order for UEs not to confuse system information updates and SIB2 reception from different TRPs.

PRACH configuration(s) can be per TRP or beam and UE transmits PRACH preamble targeting a single narrow beam at a PRACH attempt. Beam RSs may be different according to TRPs.

Steps S3-A and S3-B in FIG. 12 can be done in one step. Information on the RS configuration and RACH configuration per beam are transmitted in SIB1 in step S3-A, and the RS (i.e., beam RS) itself is transmitted next in order for the UE to identify the beam directions. In other words, referring to FIG. 12, information of beam RS(s) per TRP is transmitted via SIB1 at step S3-A. At step S3-3, a UE cannot differentiate TRPs from each other yet. Beam RS(s) per TRP is transmitted from a corresponding TRP according to the information of beam RS(s) per TRP at step S3-B, and then the UE can differentiate TRPs from each other based on the received beam RS(s). In FIG. 12, although it is depicted as SIB transmission from TRP A and SIB transmission from TRP B use different time resources at step S3-B, the SIB transmission from TRP A and the SIB transmission from TRP B may occur using the same time-frequency resource.

TRP-Based RACH Configuration

A RACH resource can be TRP-specifically defined. Based on the TRP RS, a UE is able to identify TRP(s). A RACH resource can be defined per TRP, and a UE can choose its RACH resource to transmit PRACH preamble based on the TRP RS received power. As long as a UE can identify its received best TRP, the UE can report best TRP ID(s) explicitly to the network. The UE attempts PRACH preamble transmission on the RACH resource associated with a specific TRP and waits for a RAR within a RAR reception window from the network. Based on the RAR, the UE transmits Msg3 on the indicated time/frequency resource in the received RAR. The UE may report best received TRP ID(s) in the Msg3. Msg4 may confirm TRP ID(s) that will be serving the UE.

In case of beam-based SIB approach, this approach can be interpreted as TRP-based SIB approach. In order to simplify description and to aid understanding, the present invention proposes a TRP based RACH procedure in which a "TRP" can be replaced with a "beam or SS Block" and vice versa. In other words, a RACH resource can be beam-specifically defined. Based on the beam RS, a UE is able to identify beam(s). A RACH resource can be defined per beam, and a UE can choose its RACH resource to transmit PRACH preamble based on the beam RS received power. As long as a UE can identify its received best beam, the UE can report best beam ID(s) explicitly to the network. The UE attempts PRACH preamble transmission on the RACH resource associated with a specific TRP and waits for a RAR within a RAR reception window from the network. Based on the RAR, the UE transmits Msg3 on the indicated time/frequency resource in the received RAR. The UE may report best received beam ID(s) in the Msg3. Msg4 may confirm beam ID(s) that will be serving the UE.

In this case, it becomes a bit complicated performing a RACH procedure since a UE receives multiple RACH resources in a cell. In other words, a UE can try multiple PRACH transmissions on different RACH resources, and it has to be decided whether the RACH procedure is per UE or per TRP (RACH resource).

Per UE RACH Procedure:

RACH procedure per UE implies that a single RACH procedure will be performed per UE. In other words, among RACH resources for multiple TRPs, a UE may select a RACH resource for PRACH preamble transmission targeting a specific TRP. The UE waits for its RAR from the TRP on the transmitted PRACH preamble, and if the UE fails to receive the RAR within the RAR window and the UE retries second attempt for PRACH transmission On the second attempt for PRACH preamble transmission, the UE may select other RACH resource for PRACH preamble transmission targeting other TRP. Alternatively, the UE may retry transmission of PRACH preamble on the same RACH resource targeting the same TRP where PRACH transmission power should be ramped up than that of the previous attempt. It should be UE's choice whether the UE transmits a PRACH preamble targeting the same TRP as the previous transmitted PRACH preamble or targeting different TRP from the previous transmitted PRACH preamble. But in this case, power ramping should be applied to retransmission of PRACH preamble targeting the same TRP.

Per TRP RACH Procedure (Possibly Equivalent to Per Beam RACH Procedure):

RACH procedure Per TRP implies that multiple RACH procedures per UE can be performed simultaneously. RACH procedures targeting different TRPs can be performed independently. A UE may transmit multiple PRACH preambles targeting different TRPs without respect to reception of a RAR within a RAR window. On the transmitted multiple PRACH preambles targeting different TRPs, each TRP may respond with RAR on each PRACH preamble so that multiple PRACH procedures hold at the UE side. In the middle of RACH procedure, possibly with Msg3, multiple RACH procedures will be resolved to a single one by selecting a TRP. Based on the received RARs from multiple TPRs, a UE can choose which RAR the UE will follow to transmit Msg3 (see Option 1 and Option 2). However, this method brings waste of UL resources assigned for Msg3 transmissions. On the other hand, resolution for multiple RACH procedures can be done after completion of multiple RACH procedures by confirmation of TRP ID in Msg4 or later DL signaling (see Option 1).

<II. Consideration of Introducing Multiple Beams>

In the above description, a RACH procedure has been elaborated considering multiple TRPs, and similar impact is introduced in case of multiple beam operation. In other words, the similar handling on the RACH procedure is considered for a case where RACH configuration is per cell with multiple beams and for a case where RACH configuration is per cell with multiple TRPs. Similarly, handling on the RACH procedure for a case where RACH configuration is per TRP with multiple TRP operation in a cell would be the same as the case where RACH configuration is per beam with multiple beam operation in a cell.

In order to support a seamless connection to a UE with mobility, multiple TRP operation within a cell is considered. In a very initial state, a UE firstly tries to get time/frequency synchronization based on the SS detection and possibly the UE acquires a cell ID, and then the UE decodes PBCH to get the essential system information. It is expected that SS and PBCH are transmitted with SFN manner from multiple TRPs sharing a cell ID, which can be transmitted with a relatively wider beam than that of beam RS (e.g. CSI-RS).

On the other hand, due to multiple beam operation especially for above 6 GHz, association between DL broadcast channel/signal and RACH resources may be considered. The RACH resource includes a time/frequency resource on which PRACH preamble can be transmitted, a time/frequency resource on which RAR from gNB can be transmitted, PRACH preamble information, and etc. More specifically, the RACH resource may include beam directional information corresponding to DL broadcast channel/signal, namely PSS/SSS/PBCH direction, and the RACH resource would be different per the direction.

In this subsection, the present invention propose ways to perform rather narrow beam acquisition during a RACH procedure. In general, a RACH resource is associated with SS/PBCH (i.e. SS block) transmission beam direction (or index). In this case, transmission and reception beam are as wide as a SS block beam width. A UE has to refine its transmitting/receiving beam(s) at a certain stage, and this can be done during RACH procedure or after the UE gets RRC-connected (after the RACH procedure).

Beam Refinement During RACH Procedure-Aperiodic CSI-RS

In order for a UE to perform beam refinement during a RACH procedure, a UE should have knowledge on the narrow beam RS(s) and be able to measure the narrow beam RS(s). Given that a RACH resource is associated with the SS block, the UE selects its RACH time-frequency resource for PRACH Msg1 preamble transmission based on the SS block measurements (assuming there can be one or more SS blocks). After receiving PRACH Msg1 from UEs, a gNB can provide UEs with CSI-RSs, which possibly have narrow beam widths.

In PRACH configuration, a network may provide whether or not there can be a network signaling on the transmission of CSI-RS during a RACH procedure. In more detail, the network signaling also provides the triggering instance of the CSI-RS during a RACH procedure. "During a RACH procedure" here means that it should be before the UE establishes a RRC connection.

In the following, the details of the procedure for beam refinement during RACH procedure are proposed.

A UE sends PRACH Msg1 preamble.

Within a RAR window, the UE waits for a RAR (Msg2).

While the UE is waiting for the RAR, the UE may receive DCI (or PDCCH) informing aperiodic CSI-RS transmission by using RA-RNTI. The DCI indicates the aperiodic CSI-RS transmission, and CSI-RS configuration information for the aperiodic CSI-RS (e.g., transmission timing (e.g. slot), symbols, transmission bandwidth, number of ports and etc. for the aperiodic CSI-RS transmission). The UE may be provided CSI-RS resource/patterns in advance, by minimum system information (i.e. SIB). Alternatively, the respective PDSCH corresponding to the DCI (or PDCCH) may include the CSI-RS configuration information. The CSI-RS transmission instance can be fixed by the specification, in terms of timing offset (e.g. number of slots/symbols/etc.) from the DCI reception. In other words, the CSI-RS transmission instance may be defined in the system.

Receiving the DCI, the UE measures the CSI-RS based on the signaling (i.e., CSI-RS configuration information) and the UE can refine DL transmission beam.

If the UE receives the RAR, the UE transmits Msg3 in response to the RAR. The Msg3 includes the best received beams (e.g. best beam indices) based on the RSs.

If the UE is informed about the (aperiodic) CSI-RS and measures it, the UE reports its DL beam indices based on the measured CSI-RSs and CSI-RS quality (CSI-RS RSRP) in addition.

If the UE is not informed about the (aperiodic) CSI-RS and it does not measures the CSI-RS, the UE reports its DL beam indices based on the measured SS bocks and SS block quality (SS-block RSRP) in addition.

The UE can also report the measured RSRP based on either or both of SS block or CSI-RS. If the UE only measured SS block, it only reports SS block RSRP if network commands. If the UE measured CSI-RS in addition to SS block, the UE reports both of CSI-RS and SS block RSRP. If network commands either of CSI-RS RSRP or SS block RSRP, UE reports the indicated RSRP.

If the UE detects DCI using RA-RNTI (possibly CRC masked) within the RAR window and the DCI is not for the RAR Msg2, the UE keeps monitoring the control channel search space using the RA-RNTI until it receives its RAR within the RAR window.

On the other hand, the indication of the aperiodic CSI-RS transmission can be done via a RAR. In this case, the RAR may include the indication whether aperiodic CSI-RS is transmitted or not. If a UE receives the indication that the aperiodic CSI-RS will be transmitted, the UE monitors and measures the indicated CSI-RS. The RAR may include the information about the aperiodic CSI-RS configurations (e.g., the number of ports, transmission instance, bandwidth and etc.). Alternatively, based on the indication in the RAR, the UE is configured to monitor additional DCI with RA-RNTI to receive the CSI-RS configuration within the DCI or the corresponding PDSCH. Having the CSI-RS configuration, the UE monitors and measures the aperiodic CSI-RS based on the CSI-RS configuration. Upon receiving and measuring the aperiodic CSI-RS, the UE reports the best received beam indices and the beam quality (RSRP), respectively, in Msg3.

On the configuration of the aperiodic CSI-RS, CSI-RS resource mapping assuming the maximum number of antenna ports can be fixed by the specification (i.e., pre-defined in the system) per frequency band, and the DCI triggering aperidic CSI-RS transmission can indicate the number of RS ports, transmission bandwidth, and subset of CSI-RS resources.

In summary, aperiodic CSI-RS configuration information (DCI using RA-RNTI) can be transmitted before the RAR transmission using the RA-RNTI. Alternatively, the RAR may provide the information on the upcoming aperiodic CSI-RS, and a UE receives the RS configuration information (DCI using RA-RNTI) or directly measure the aperiodic CSI-RS.

Referring to FIG. 12, PRACH resources are assumed to be associated with the SFNed SS/PBCH and SIB transmission beam direction. In FIG. 12, steps S1, S2, and S3 can happen within the same subframe, e.g., as one SS block. PBCH may indicate SIB transmission information including a time and frequency location where SIB(s) are to be transmitted. Here, UE assumes the same DM-RS (including DM-RS sequence, number of DM-RS ports, and transmission schemes) for PBCH demodulation and SIB demodulation. Or, DM-RS sequences for PBCH and SIB may differ but UE can easily extract the sequence information for the SIB from the DM-RS sequence used for PBCH demodulation.

In this case, the UE transmits PRACH preamble based on the received SS/PBCH/SIB direction on the RACH resource associated with a SS/PBCH/SIB whose beam is relatively wide, while the UE does not have any information on the narrow beam(s). Here, SIB includes configuration information of the RACH resources, which is possibly per relatively wide beam (i.e. a combined beam of multiple narrow beams and beams from multiple TRPs). The SIB also carries the narrow beam RS information, i.e. CSI-RS configuration information (e.g., total number of beam RS ports, the number of beam RS ports per symbol, beam RS sequences, and etc.).

Using PRACH configuration on the RACH resources, a UE transmits a PRACH preamble possibly targeting a wide SS block direction because PRACH configuration/resources are associated with the SS block.

3. Minimum System Information Reception

For the beam identification, multiple CSI-RSs can be transmitted per SS block beam coverage, and RS information should be known to UE a priori. To support CSI-RS based RACH procedure, PRACH configuration and the RACH resource association per beam should be provided and PRACH configuration is carried by SIB. A network can provide the SIB with beam sweeping manner and CSI-RS configuration within the SIB, and also the network can transmit the beam swept CSI-RS in addition. The SIB is transmitted first and beam swept CSI-RS is transmitted next. The SIB provides the CSI-RS configuration including the number of ports, CSI-RS resource sets, transmission bandwidth and etc. The SIB in the present invention means the system information that UE has to receive and decode before the UE gets access to the network and it may include the MIB and at least SIB1 in LTE terminology. In NR, 3GPP defines the term as the minimum system information that UE has to receive and decode before getting access to the network and which should be always broadcasted. Part of the minimum system information is transmitted in the PBCH, which can be called MIB, and the remaining minimum system information is transmitted in other data channel after PBCH, which correspond to SIB in the present invention.

By receiving the beam swept SIB and CSI-RS, a UE is able to identify its best beams and corresponding PRACH resources/configurations. Note that the beam granularity of the SIB and the CSI-RS are different. CSI-RS is transmitted/received with narrower beam than that of SIB/SS block.

DM-RS of the Remaining Minimum System Information

For receiving beam swept SIB and beam specific RS, DM-RS information for demodulation of SIB and the number of DM-RS ports should be known to UEs. A UE may assume that the same DM-RS sequences/ports are used for the demodulation of SIB. One of the following options may be used for the SIB demodulation.

A UE may assume that the DM-RS information applied to PBCH (PBCH DM-RS information) is applied to the PDCCH demodulation, which schedules the PDSCH carrying the SIB. The seed of the PBCH DM-RS includes a cell ID and a SS block index. The PDCCH which schedules the PDSCH carrying the SIB provides the DM-RS information of the PDSCH carrying the SIB.

A UE may assume that the DM-RS used for PBCH is applied to the PDCCH demodulation, which schedules the PDSCH carrying the SIB. The seed of the PBCH DM-RS includes a cell ID and a SS block index. DM-RS for PDSCH carrying the SIB is calculated based on the time/frequency location of the scheduled PRB, cell ID and part of the information is specified by the specification.

A UE may assume that the PBCH DM-RS information is applied to the PDCCH and corresponding PDSCH carrying the SIB.

PBCH signals DM-RS information of PDCCH and corresponding PDSCH carrying the SIB.

PBCH signals DM-RS information of PDCCH which schedules the PDSCH carrying the SIB. The PDCCH which schedules the PDSCH carrying the SIB signals the DM-RS information of the PDSCH carrying the SIB.

Figure 13:
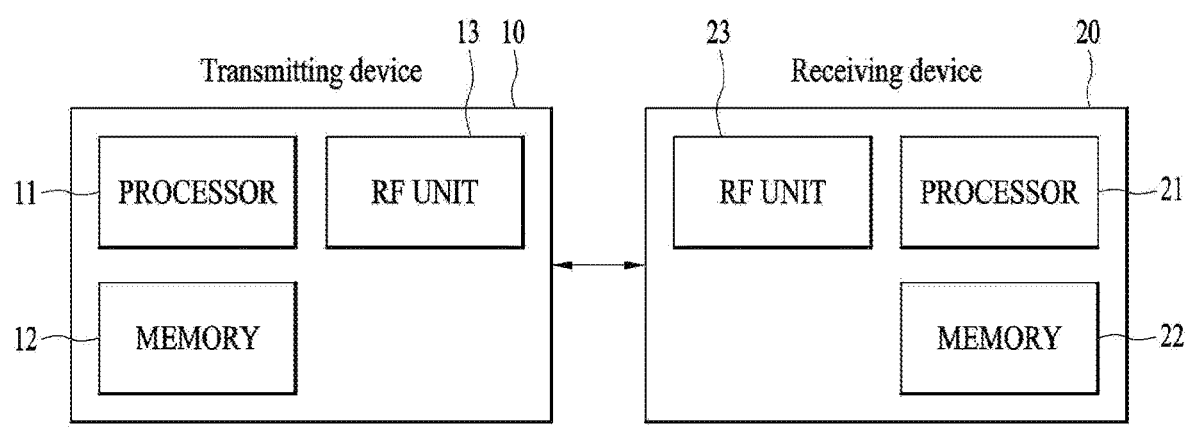
FIG. 13 is a block diagram illustrating elements of a transmitting device 10 and a receiving device 20 for implementing the present invention.

FIG. 13 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

In the present invention, each TRP of an eNB may include a RF unit. Hereinafter, eNB RF unit denotes a RF unit at a TRP of the eNB. The eNB processor controls each TRP or a RF unit of each TRP to transmit an SS block (consisting of PSS/SSS and/or PBCH). If a TRP of the eNB can form multiple Tx and/or Rx beams, the eNB processor may control the TRP to transmit the SS block while changing the TRP's beam across the multiple beams in a time domain. In the present invention, transmitting the SS block at all the multiple beams of a TRP may be considered as transmitting the SS block at one transmission instance.

RACH resources may be associated with a SS block, TRP(s), and/or beam(s). The eNB processor may configure RACH resources and control the eNB RF unit to transmit configuration information of the RACH resources according to the present invention. The UE processor may control the UE RF unit to receive the configuration information of the RACH resources. The UE processor is configured to control its random access (RA) preamble of a RA procedure on a RACH resource associated with a SS block, TRP or beam.

For example, the UE processor can control a UE RF unit to receive the SS block, and control the UE RF unit to transmit its random access preamble on a RACH resource associated with the SS block. The eNB processor may control the eNB RF unit to transmission CSI-RSs to the UE during the RA procedure before completion of the RA procedure. The CSI-RSs are transmitted with narrower beam than that of the SS block. In other words, the eNB processor may have the UE receive/detect the CSI-RSs such that the UE can differentiate TRPs or beams of the eNB from each other by using the CSI-RSs. The eNB processor may control the eNB RF unit to transmit an indication that there will be CSI-RS transmission to the UE, according to the present invention. The UE processor may control the UE RF unit to receive the indication according to the present invention. The eNB processor may control the eNB RF unit to transmit configuration information of the CSI-RSs according to the present invention. The UE processor may control the UE RF unit to receive the configuration information of the CSI-RSs according to the present invention. The UE processor may control the UE RF unit to the CSI-RSs, based on the configuration information, during the RA procedure. The UE processor may measure channel quality of TRP(s) or beam(s) based on the CSI-RSs and control the UE RF unit to report best TRP(s) or best DL Tx beam(s) based on measured channel quality. The UE processor may control the UE RF unit to receive a RAR for the RA preamble according to the present invention. The UE processor may control the UE RF unit to report the best TRP(s) or DL Tx beam(s) using the RAR (e.g., using a UL grant included in the RAR) according to the present invention. The eNB processor may control the eNB RF unit to receive the report indicating the best TRP(s) or DL Tx beam(s), and select a DL Tx beam or TRP based on the report, and control the eNB RF unit to transmit DL signals to the UE using the selected TRP or Tx beam.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for transmitting, by a user equipment (UE), random access (RA) signals, the method comprising:
  receiving, by the UE, a synchronization signal (SS) block;
  transmitting, by the UE, a RA preamble on a random access channel (RACH) resource corresponding to the SS block;
  receiving, by the UE, first downlink control information (DCI) for a random access response (RAR) to the RA preamble;
  receiving, by the UE, the RAR to the RA preamble based on the first DCI, wherein the RAR includes an indication of transmission of an aperiodic channel status information-reference signal (CSI-RS);
  receiving, by the UE, second DCI including configuration information for the aperiodic CSI-RS;
  receiving, by the UE, the aperiodic CSI-RS based on the second DCI;
  reporting, by the UE, a downlink transmission beam based on the aperiodic CSI-RS in response to the RAR; and
  establishing a radio resource control (RRC) connection.

2. A method for receiving, by a base station (BS), random access (RA) signals, the method comprising:
  transmitting, by the BS, a synchronization signal (SS) block;
  receiving, by the BS, a RA preamble on a random access channel (RACH) resource corresponding to the SS block from a UE;
  transmitting, by the BS, first downlink control information (DCI) for a random access response (RAR) to the RA preamble;
  transmitting, by the BS, the RAR to the RA preamble based on the first DCI to the UE, wherein the RAR includes an indication of transmission of an aperiodic channel status information-reference signal (CSI-RS);
  transmitting, by the BS, second DCI including configuration information for the aperiodic CSI-RS;
  transmitting, by the BS, the aperiodic CSI-RS based on the second DCI;
  receiving, by the BS, a report indicating a downlink transmission beam based on the aperiodic CSI-RS in response to the RAR from the UE; and
  establishing a radio resource control (RRC) connection.

3. A user equipment (UE) for transmitting random access (RA) signals, the method comprising:
  a transceiver, and
  a processor configured to control the transceiver, the processor configured to:
  control the transceiver to receive a synchronization signal (SS) block;
  control the transceiver to transmit a RA preamble on a random access channel (RACH) resource corresponding to the SS block;
  control the transceiver to receive first downlink control information (DCI) for a random access response (RAR) to the RA preamble;
  control the transceiver to receive the RAR to the RA preamble based on the first DCI, wherein the RAR includes an indication of transmission of an aperiodic channel status information-reference signal (CSI-RS);
  control the transceiver to receive second DCI including configuration information for the aperiodic CSI-RS;
  control the transceiver to receive the aperiodic CSI-RS based on the second DCI;
  control the transceiver to report a downlink transmission beam based on the aperiodic CSI-RS in response to the RAR; and
  control the RF unit to establish a radio resource control (RRC) connection.

4. A base station (BS) for receiving random access (RA) signals, the method comprising:
  a transceiver, and
  a processor configured to control the transceiver, the processor configured to:
  control the transceiver to transmit a synchronization signal (SS) block;
  control the transceiver to receive a RA preamble on a random access channel (RA) resource corresponding to the SS block from a UE;

control the transceiver to transmit first downlink control information (DCI) for a random access response (RAR) to the RA preamble;
control the transceiver to transmit the RAR to the RA preamble based on the first DCI to the UE, wherein the RAR includes an indication of transmission of an aperiodic channel status information-reference signal (CSI-RS);
control the transceiver to transmit second DCI including configuration information for the aperiodic CSI-RS;
control the transceiver to transmit the aperiodic CSI-RS based on the second DCI;
control the transceiver to receive a report indicating a downlink transmission beam based on the aperiodic CSI-RS in response to the RAR from the UE; and
control the transceiver to establish a radio resource control (RRC) connection.

\* \* \* \* \*